(12) United States Patent
Kim

(10) Patent No.: US 8,488,297 B2
(45) Date of Patent: Jul. 16, 2013

(54) MULTILAYER CERAMIC ELECTRONIC COMPONENT

(75) Inventor: Sang Huk Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/478,965

(22) Filed: May 23, 2012

(65) Prior Publication Data
US 2013/0027839 A1    Jan. 31, 2013

(30) Foreign Application Priority Data
Jul. 28, 2011    (KR) .................. 10-2011-0075083

(51) Int. Cl.
*H01G 4/005*    (2006.01)
*H01G 4/06*    (2006.01)

(52) U.S. Cl.
USPC ........................................... 361/311; 361/303

(58) Field of Classification Search
USPC ................................. 361/303, 311
See application file for complete search history.

(56) References Cited

U.S. PATENT DOCUMENTS
6,320,738 B1    11/2001   Yamana et al.
2009/0128988 A1*  5/2009  Sohn et al. ................. 361/321.4

FOREIGN PATENT DOCUMENTS
JP    07-211132    8/1995
JP    10-012477    1/1998
JP    2003-178926  6/2003

* cited by examiner

*Primary Examiner* — Eric Thomas
(74) *Attorney, Agent, or Firm* — McDermott Will & Emery LLP

(57) ABSTRACT

There is provided a multilayer ceramic electronic component including: a ceramic body including a dielectric layer; and first and second inner electrode layers formed within the ceramic body, wherein, when a thickness of the dielectric layer is defined as td and a maximum thickness and a minimum thickness of the first or second inner electrode layer are defined as tmax and tmin, respectively, $td \leq 0.6$ μm and $(tmax-tmin)/td < 0.30$ are satisfied. According to the present invention, a large-capacity multilayer ceramic electronic component capable of improving withstand voltage characteristics and having excellent reliability can be realized by improving uniformity in the thickness of the inner electrode layers.

15 Claims, 2 Drawing Sheets

A

MULTILAYER CERAMIC ELECTRONIC COMPONENT

CROSS-REFERENCE TO RELATED APPLICATIONS

This application claims the priority of Korean Patent Application No. 10-2011-0075083 filed on Jul. 28, 2011, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a large-capacity multilayer ceramic electronic component capable of improving withstand voltage characteristics and having excellent reliability.

2. Description of the Related Art

In accordance with the recent trend for the miniaturization of electronic products, the demand for multilayer ceramic electronic components having a small size yet a large capacitance has increased.

Therefore, dielectric layers and inner electrode layers have been thinned and increasingly multilayered by various methods. Recently, as the dielectric layers have been thinned, multilayer ceramic electronic components having an increased number of lamination layers have been manufactured.

As the dielectric layers and the inner electrode layers are thinned in order to realize larger capacitances, the thicknesses of the inner electrode layers may neither be uniform nor continuously maintained, and thus, the inner electrode layers may be partially disconnected, thereby causing a break in the connectivity thereof.

When the thicknesses of the inner electrode layers are not uniform, thick portions of adjacent inner electrode layers may be close to each other, resulting in deteriorating breakdown voltage (BDV) characteristics.

The above problem causes insulating properties to be deteriorated, resulting in a deterioration of the reliability of multilayer ceramic electronic components.

SUMMARY OF THE INVENTION

An aspect of the present invention provides a large-capacity multilayer ceramic electronic component capable of having improved withstand voltage characteristics and excellent reliability.

According to an aspect of the present invention, there is provided a multilayer ceramic electronic component, including: a ceramic body including a dielectric layer; and first and second inner electrode layers formed within the ceramic body, wherein, when a thickness of the dielectric layer is defined as td, and a maximum thickness and a minimum thickness of the first or second inner electrode layer are defined as tmax and tmin, respectively, td$\leq$0.6 μm and (tmax−tmin)/td<0.30 are satisfied.

The thickness of the dielectric layer may be measured by scanning a cross section in a length-thickness (L-T) direction, which is cut in a central portion in a width (W) direction of the ceramic body.

When a thickness of the first or second inner electrode layer is defined as te, te$\leq$0.6 μm may be satisfied.

The thickness of the first or second inner electrode layer may be measured by scanning a cross section in a length-thickness (L-T) direction, which is cut in a central portion in a width (W) direction of the ceramic body.

When an average diameter of ceramic powder particles used in the dielectric layer is defined as Dd and an average diameter of metal powder particles used in the first and second inner electrode layers is defined as De, 0.8$\leq$De/Dd$\leq$1.2 may be satisfied.

A ratio (td/te) of the thickness of the dielectric layer to the thickness of the first or second inner electrode layer may satisfy 1.0$\leq$td/te$\leq$1.5.

According to another aspect of the present invention, there is provided a multilayer ceramic electronic component, including: a ceramic body including a plurality of dielectric layers laminated therein; and a plurality of inner electrode layers formed within the ceramic body, wherein, when an average thickness of the plurality of dielectric layers is defined as td, and a maximum thickness and a minimum thickness of a single inner electrode layer selected from the plurality of inner electrode layers are defined as tmax and tmin, respectively, td$\leq$0.6 μm and (tmax−tmin)/td<0.30 are satisfied.

The average thickness of the plurality of dielectric layers may be measured by scanning a cross section in a length-thickness (L-T) direction, which is cut in a central portion in a width (W) direction of the ceramic body.

When an average thickness of the single inner electrode layer selected from the plurality of inner electrode layers is defined as te, te$\leq$0.6 μm may be satisfied.

The average thickness of the single inner electrode layer selected from the plurality of inner electrode layers may be measured by scanning a central portion of a cross section in a length-thickness (L-T) direction, which is cut in a central portion in a width (W) direction of the ceramic body.

When an average diameter of ceramic powder particles used in the dielectric layers is defined as Dd and an average diameter of metal powder particles used in the inner electrode layers is defined as De, 0.8$\leq$De/Dd$\leq$1.2 may be satisfied.

A ratio (td/te) of the average thickness of the plurality of dielectric layers to the average thickness of the single inner electrode layer selected from the plurality of inner electrode layers may satisfy 1.0$\leq$td/te$\leq$1.5.

According to another aspect of the present invention, there is provided a multilayer ceramic electronic component, including: a ceramic body including a plurality of dielectric layers laminated therein; and a plurality of inner electrode layers formed within the ceramic body, wherein, when an average thickness of the plurality of dielectric layers is defined as td, and a maximum thickness and a minimum thickness of the plurality of inner electrode layers are defined as tmax and tmin, respectively, td$\leq$0.6 μm and (tmax−tmin)/td<0.30 are satisfied.

The average thickness of the plurality of dielectric layers may be measured by scanning a cross section in a length-thickness (L-T) direction, which is cut in a central portion in a width (W) direction of the ceramic body.

When an average thickness of the plurality of inner electrode layers is defined as te, te$\leq$0.6 μm may be satisfied.

The average thickness of the plurality of inner electrode layers may be measured by scanning a cross section in a length-thickness (L-T) direction, which is cut in a central portion in a width (W) direction of the ceramic body.

When an average diameter of ceramic powder particles used in the dielectric layer is defined as Dd and an average diameter of metal powder particles used in the inner electrode layers is defined as De, 0.8$\leq$De/Dd$\leq$1.2 may be satisfied.

A ratio (td/te) of the average thickness of the plurality of dielectric layers to an average thickness of the plurality of inner electrode layers may satisfy $1.0 \leq td/te \leq 1.5$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
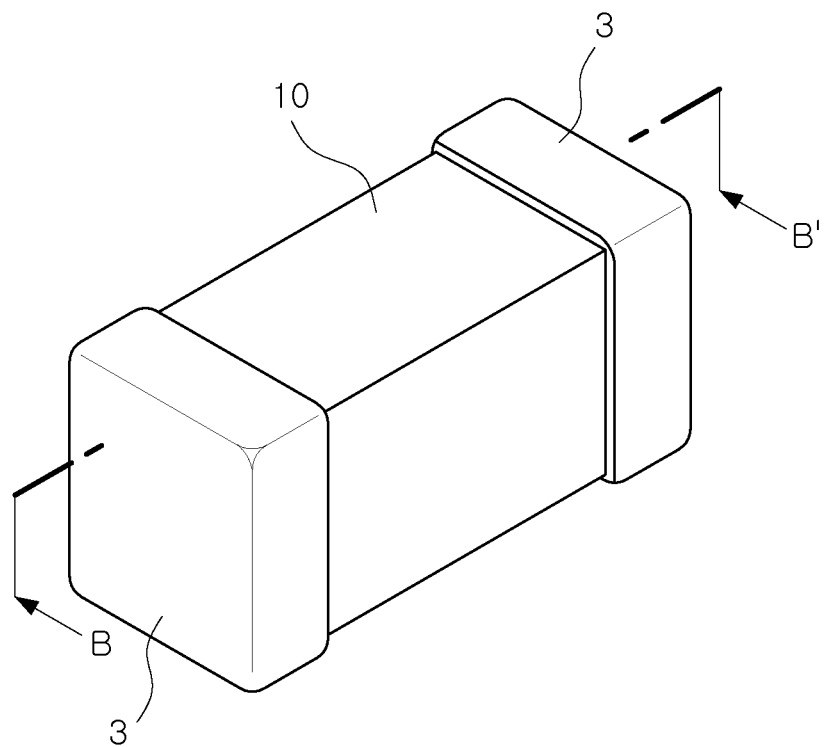
FIG. 1 is a perspective view schematically showing a multilayer ceramic capacitor according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of components may be exaggerated for clarity, and the same reference numerals will be used throughout to designate the same or like components.

FIG. 1 is a perspective view schematically showing a multilayer ceramic capacitor according to an embodiment of the present invention.

Figure 2:
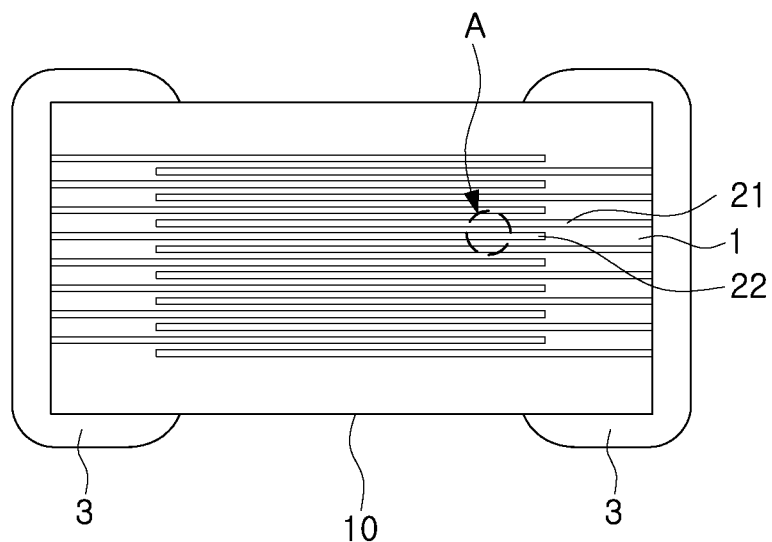
FIG. 2 is a cross-sectional view taken along line B-B' of FIG. 1.

FIG. 2 is a cross-sectional view taken along line B-B' of FIG. 1.

Figure 3:
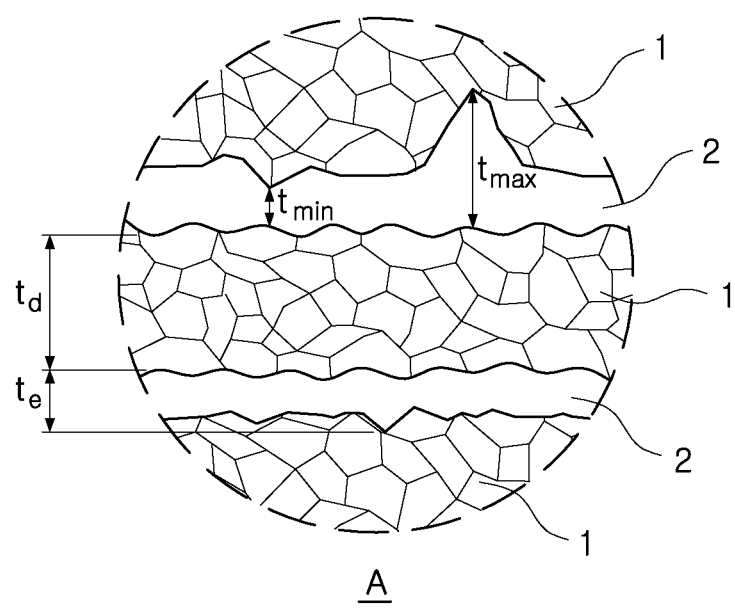
FIG. 3 is an enlarged view showing the thicknesses of inner electrode layers and dielectric layers in portion A of FIG. 2.

FIG. 3 is an enlarged view showing the thicknesses of inner electrode layers and dielectric layers in portion A of FIG. 2.

Referring to FIGS. 1 through 3, a multilayer ceramic electronic component according to an embodiment of the present invention may include a ceramic body 10 including a dielectric layer 1, and first and second inner electrode layers 21 and 22 formed within the ceramic body 10. When an average thickness of the dielectric layer 1 is defined as td, and a maximum thickness and a minimum thickness of the first or second inner electrode layer 21 or 22 are defined as tmax and tmin, respectively, $td \leq 0.6$ μm and $(tmax-tmin)/td < 0.30$ may be satisfied.

Hereinafter, the multilayer ceramic electronic component according to the embodiment of the present invention, particularly, a multilayer ceramic capacitor, will be described, but the present invention is not limited thereto.

According to the embodiment of the present invention, a raw material for forming the dielectric layer 1 is not particularly limited as long as sufficient capacitances can be obtained. For example, the raw material may be a barium titanate ($BaTiO_3$) powder.

As a material for forming the dielectric layer 1, various ceramic additives, organic solvents, plasticizers, binders, dispersants, or the like may be added to a powder such as the barium titanate (BaTiO3) powder, so as to attain objects of the present invention.

A material for forming the first and second inner electrode layers 21 and 22 is not particularly limited, and may be formed by using a conductive paste made of at least one of, for example, precious metal materials, such as palladium (Pd), palladium-silver (Pd-Ag) alloy and the like, nickel (Ni), and copper (Cu).

Outer electrodes 3 may be formed outside the ceramic body 10 in order to form capacitance, and may be electrically connected with the first and second inner electrode layers 21 and 22.

The outer electrodes 3 may be formed of the same conductive material as that of the inner electrode layers, but not limited thereto. For example, copper (Cu), silver (Ag), nickel (Ni), or the like may be used for the outer electrodes 3.

The outer electrode 3 may be formed by coating a conductive paste prepared by adding glass frit in a metal powder, and then sintering.

Referring to FIGS. 2 and 3, in the multilayer ceramic electronic component according to the embodiment of the present invention, the average thickness td of the dielectric layer 1 may be 0.6 μm or less.

In the embodiment of the present invention, the thickness of the dielectric layer 1 may refer to an average thickness of the dielectric layer 1 disposed between the first and second inner electrode layers 21 and 22.

The average thickness of the dielectric layer 1 may be measured by scanning a cross section in a length direction of the ceramic body 10, using a scanning electron microscope (SEM), as shown in FIG. 2.

For example, as shown in FIG. 2, the average thickness of the dielectric layer 1 may be obtained by measuring thickness at 30 equidistant points in a length direction, in a single dielectric layer extracted from an image obtained by scanning a cross section in a length-thickness (L-T) direction, which is cut in a central portion in a width (W) direction of the ceramic body 10, using a scanning electron microscope (SEM), and then calculating an average thickness value.

The thickness at 30 equidistant points may be measured in a capacitance forming part, referring to an area in which the first and second inner electrode layers 21 and 22 overlap each other.

The average diameter of ceramic powder particles used in forming the dielectric layer 1 is not particularly limited, and may be controlled in order to achieve objects of the present invention, for example, to 400 nm or less.

However, when the ultra-thin dielectric layer 1 having an average thickness td of 0.6 μm or less is applied as mentioned above, non-uniformity in the thicknesses of the first and second inner electrode layers 21 and 22 may cause frequent short circuits therebetween within the dielectric layer 1.

As the first and second inner electrode layer 21 and 22 are thinned in order to realize large capacitance, the thicknesses thereof are more non-uniform, and thus, the above problem may occur more frequently.

In addition, since the thin-film dielectric layer 1 is formed between the first and second inner electrode layers 21 and 22, non-uniformity in the thicknesses of the first and second inner electrode layers 21 and 22 causes a distance therebetween to be shortened, thereby deteriorating breakdown voltage (BDV) characteristics.

Therefore, according to the embodiment of the present invention, the above problems can be solved by satisfying $(tmax-tmin)/td < 0.30$, where an average thickness of the dielectric layer 1 is defined as td, and a maximum thickness and a minimum thickness of the first or second inner electrode layer 21 or 22 are defined as tmax and tmin, respectively.

Specifically, when a value of $(tmax-tmin)/td$ is below 0.30, non-uniformity in the thickness of an inner electrode layer 2 can be minimized, thereby preventing short circuits and deterioration of the breakdown voltage (BDV) characteristics.

For this reason, even in a case in which the ultra-thin film dielectric layer 1 having the average thickness (td) of 0.6 μm or less is applied, a large-capacity multilayer ceramic electronic component having improved withstand voltage characteristics and excellent reliability can be realized.

The maximum thickness tmax and the minimum thickness tmin of the first or second inner electrode layer 21 or 22 are not particularly limited, but, for example, may be determined from values obtained by measuring thicknesses of all sections in a length direction of a single inner electrode layer.

Also, the maximum thickness tmax and the minimum thickness tmin may be determined from values obtained by measuring thicknesses in any one section among 30 evenly divided sections in a length direction of a single inner electrode layer, for example, a thickness of a central section thereamong.

Specifically, the thickness of the inner electrode layer extracted from an image obtained by scanning a cross section in a length-thickness (L-T) direction, which is cut in a central portion in a width (W) direction of the ceramic body 10, using a scanning electron microscope (SEM) may be measured.

When a ratio of a difference between the maximum thickness tmax and the minimum thickness tmin of the inner electrode layer 2 to the average thickness td of 0.6 µm or less of the dielectric layer 1 is below 0.30, withstand voltage characteristics may be improved.

If a value of (tmax−tmin)/td is 0.30 or more, the difference between the maximum thickness and the minimum thickness of the inner electrode layer becomes larger, and thus, short circuits may frequently occur to thereby deteriorate withstand voltage characteristics.

Meanwhile, in order to decrease the difference between the maximum thickness tmax and the minimum thickness tmin of the first or second inner electrode layer 21 or 22, the size or amount of metal powder particles may be varied and the amounts of organic materials and ceramic materials to be added may be controlled in the conductive paste for the inner electrode layer.

In addition, the thickness of the inner electrode layer may be controlled in a printing process of forming the inner electrode layer using the conductive paste.

In addition, the difference between the maximum thickness tmax and the minimum thickness tmin of the inner electrode layer may be controlled by regulating a temperature rise rate and a sintering atmosphere during a sintering process.

According to the embodiment of the present invention, in order to decrease the difference between the maximum thickness tmax and the minimum thickness tmin of the inner electrode layer, the amount of organic materials added in the conductive paste for forming the inner electrode layer may be controlled.

Specifically, examples of additives added in the conductive paste may include a binder resin, an inorganic material, a solvent, and the like. The organic material is not particularly limited, and for example, may utilize terpineol in case of the solvent.

The amount of solvent in the added organic materials may be controlled to regulate viscosity of the conductive paste. Therefore, a low-viscosity conductive paste may be coated on the dielectric layer 1 to decrease a difference in the thickness of the inner electrode layer.

In addition, when an average thickness of the first or second inner electrode layer is defined as te, te≦0.6 µm may be satisfied.

The average thickness of the first or second inner electrode layer is not particularly limited, but, for example, may refer to an average thickness of the inner electrode layer in a cross section in a length-thickness (L-T) direction, which is cut in a central portion in a width (W) direction of the ceramic body 10.

According to the embodiment of the present invention, a large-capacity multilayer ceramic electronic component capable of improving withstand voltage characteristics and having excellent reliability can be realized, by satisfying (tmax−tmin)/td<0.30 and te≦0.6 µm.

A method of controlling the average thickness of the first or second inner electrode layer to 0.6 µm or less is not particularly limited, and, for example, may be performed by varying the size or amount of metal powder particles or varying the content of solvent or binder resin in the conductive paste for the inner electrode layer.

In addition, the size of metal powder particles may be controlled in order to achieve the objects of the present invention, and may be, but not particularly limited to, 0.05 µm to 0.4 µm.

Meanwhile, when an average diameter of ceramic powder particles used in the dielectric layer is defined as Dd and an average diameter of metal powder particles used in the inner electrode layer is defined as De, 0.8≦De/Dd≦1.2 may be satisfied.

By controlling the ratio of the average diameter of ceramic powder particles to the average diameter of ceramic powder particles to 0.8 or more and 1.2 or less, a multilayer ceramic electronic component having excellent reliability can be realized even if thin-film dielectric and inner electrode layers are applied thereto.

In the above-mentioned range, when the ratio, De/Dd, is 0.8 or less or 1.2 or more, the difference between the average diameter of metal powder particles used in the inner electrode layer and the average diameter of ceramic powder particles used in the dielectric layer is too large. This may cause problems in capacitances and deterioration in reliability.

In addition, a ratio (td/te) of the average thickness of the dielectric layer to the average thickness of the first or second inner electrode layer may satisfy 1.0≦td/te≦1.5.

By controlling the ratio (td/te) of the average thickness of the dielectric layer to the average thickness of the first or second inner electrode layer to 1.0 or more and 1.5 or less, a multilayer ceramic electronic component having excellent reliability can be realized even if thin-film dielectric and inner electrode layers are applied thereto.

In the above-mentioned range, if the ratio, td/te, is below 1.0, there may occur problems in forming capacitances, and if above 1.5, insulating properties may be deteriorated, and thus, there may occur problems in the reliability of the multilayer ceramic electronic component.

Meanwhile, a multilayer ceramic electronic component according to another embodiment of the present invention may include a ceramic body 10 including a plurality of dielectric layers 1 laminated therein, and a plurality of inner electrode layers 21 and 22 formed within the ceramic body 10. When an average thickness of the plurality of dielectric layers 1 is defined as td and a maximum thickness and a minimum thickness of a single inner electrode layer selected from the plurality of inner electrode layers 21 and 22 are defined as tmax and tmin, respectively, td≦0.6 µm and (tmax−tmin)/td<0.30 are satisfied.

Since the multilayer ceramic electronic component according to this embodiment is substantially identical to the multilayer ceramic electronic component according to the previous embodiment except that the dielectric layers and the first and second inner electrode layers are laminated in plural, descriptions overlapping each other will be omitted.

The average thickness of the dielectric layer may refer to an average thickness of a dielectric layer in a central portion of a cross section in a length-thickness (L-T) direction, which is cut in a central portion in a width (W) direction of the ceramic body.

In addition, the number of dielectric layers for this measurement process for obtaining the average thickness value is not limited. When the measurement process is extensively performed on, for example, ten or more dielectric layers and average values thereof are measured, the average thickness of the dielectric layer may be more generalized.

Here, the maximum thickness tmax and the minimum thickness tmin of the first or second inner electrode layer 21 or 22 refer to a maximum thickness and a minimum thickness among thicknesses measured in a single inner electrode layer 2 in the ceramic body 10 in which the plurality of inner electrode layers 2 and the plurality of dielectric layers 1 are alternately laminated.

Specifically, if the maximum thickness and the minimum thickness of the inner electrode layer 2 are measured in a single inner electrode layer, the positions thereof within the inner electrode layer are not particularly limited. For example, the maximum thickness and the minimum thickness may be determined from values obtained by measuring all sections of one inner electrode layer positioned in a central portion of the laminated inner electrode layers 2.

Also, the maximum thickness and the minimum thickness may be determined from values obtained by measuring thicknesses in any one section among 30 evenly divided sections in a length direction of one inner electrode layer 2, for example, thicknesses of a central section thereamong.

When an average thickness of a single inner electrode layer selected from the plurality of inner electrode layers is defined as te, te≦0.6 μm may be satisfied.

The average thickness of a single inner electrode layer selected from the plurality of inner electrode layers is not particularly limited, but, for example, may refer to an average thickness of an inner electrode layer in a central portion of a cross section in a length-thickness (L-T) direction, which is cut in a central portion in a width (W) direction of the ceramic body 10.

A ratio (td/te) of the average thickness of the plurality of dielectric layers to the average thickness of one inner electrode layer selected from the plurality of inner electrode layers, may satisfy 1.0≦td/te≦1.5.

A multilayer ceramic electronic component according to another embodiment of the present invention may include a ceramic body 10 including a plurality of dielectric layers 1 laminated therein, and a plurality of inner electrode layers 21 and 22 formed within the ceramic body 10. When an average thickness of the plurality of dielectric layers 1 is defined as td, and a maximum thickness and a minimum thickness of the plurality of first and second inner electrode layers 21 and 22 are defined as tmax and tmin, respectively, td≦0.6 μm and (tmax−tmin)/td<0.30 are satisfied.

Since the multilayer ceramic electronic component according to this embodiment is identical to the multilayer ceramic electronic component according to the previous embodiment except that the dielectric layers and the first and second inner electrode layers are laminated in plural, descriptions overlapping each other will be omitted.

The maximum thickness tmax and the minimum thickness tmin of the plurality of first or second inner electrode layers 21 or 22 may be respectively defined as averages of values obtained by measuring the maximum thicknesses and the minimum thicknesses of the plurality of inner electrode layers.

In addition, there is no limitation on the number of inner electrode layers so long as a plurality of inner electrode layers are provided. For example, the maximum value and the minimum value may be respectively defined as average values of the maximum thicknesses and the minimum thicknesses measured in one inner electrode layer positioned in the central portion and at least one inner electrode layer adjacent thereto.

Also, the maximum value and the minimum value may be respectively defined as the average values of the maximum thicknesses and the minimum thicknesses measured in all the plurality of inner electrode layers.

The positions of individual inner electrode layers for measuring the maximum thickness tmax and the minimum thickness tmin of the plurality of inner electrode layers are not particularly limited, and, for example, the maximum thickness tmax and the minimum thickness tmin may be determined from values measured in all sections of the individual inner electrode layers.

Also, the maximum thickness tmax and the minimum thickness tmin may be determined from values obtained by measuring thicknesses in any one section among 30 evenly divided sections in a length direction of each inner electrode layer, for example, thicknesses of a central section thereof.

The average thickness of the plurality of dielectric layers 1 may be an average thickness of the dielectric layers 1 in a cross section in a length-thickness (L-T) direction, which is cut in a central portion in a width (W) direction of the ceramic body 10.

When an average thickness of the plurality of inner electrode layers is defined as te, te≦0.6 μm may be satisfied.

The average thickness of the plurality of inner electrode layers may be an average thickness of the inner electrode layers in a cross section in a length-thickness (L-T) direction, which is cut in a central portion in a width (W) direction of the ceramic body.

There is no limitation on the number of inner electrode layers so long as a plurality of inner electrode layers are provided. For example, the maximum value and the minimum value may be respectively defined as average values of thicknesses measured in an inner electrode layer positioned in the central portion and at least one inner electrode layer adjacent thereto.

In addition, the positions for measuring the average thickness of the plurality of inner electrode layers are not particularly limited, and the average thickness may be determined as averages of values obtained by measuring thicknesses in any one section among 30 evenly divided sections of each inner electrode layer in a length direction thereof, for example, thicknesses of a central section thereamong.

When an average diameter of ceramic powder particles used in the dielectric layers is defined as Dd and an average diameter of metal powder particles used in the inner electrode layers is defined as De, 0.8≦De/Dd≦1.2 may be satisfied.

A ratio (td/te) of the average thickness of the plurality of dielectric layers to the average thickness of the plurality of inner electrode layers may satisfy 1.0≦td/te≦1.5.

Hereinafter, the present invention will be described in detail with reference to examples, but is not limited thereto.

Tests were performed in order to determine whether the reliability of a multilayer ceramic capacitor, in which dielectric layers having an average thickness of 0.6 μm or less are applied, was improved or not according to an average thickness of inner electrode layers and a difference between a maximum thickness and a minimum thickness of the inner electrode layers.

Each multilayer ceramic capacitor was manufactured as follows.

First, a slurry including a powder, such as barium titanate (BaTiO3) or the like, having an average particle diameter of 0.1 μm, was coated on a carrier film and dried to prepare a plurality of ceramic green sheets having a thickness of 1 μm or 0.9 μm, thereby forming dielectric layers 1.

Then, a conductive paste for inner electrode layers having an average nickel particle size of 0.08 μm to 0.12 μm was prepared.

The conductive paste for inner electrode layers was coated on the green sheets by a screen printing method to thereby form inner electrode layers, and the resulting structures were then laminated in amounts of 190 to 250 layers to manufacture a laminate.

Laminate compressing and cutting processes were subsequently performed to manufacture a chip having a 0603 standard size, and the chip was sintered at a temperature of 1050° C. to 1200° C. under a reduction atmosphere of $H_2$ of 0.1% or less.

Finally, an outer electrode forming process, a plating process, and the like were performed to manufacture a multilayer ceramic capacitor.

Multilayer ceramic capacitor samples were variously manufactured according to the average thickness of the dielectric layers 1. As a result of observing a cross section of the multilayer ceramic capacitor, the average thickness of the inner electrode layers was 0.45 μm to 0.60 μm and the average thickness of the dielectric layers was 0.55 μm to 0.65 μm.

The average thickness of the dielectric layers, the average thickness of the inner electrode layers, and the maximum and minimum thicknesses of the inner electrode layer were measured from an image obtained by scanning a cross section in a length-thickness (L-T) direction, which is cut in a central portion in a width (W) direction of the multilayer ceramic capacitor, using a scanning electron microscope (SEM).

The average thickness of the dielectric layers was determined by measuring the thicknesses of 10 dielectric layers in a central portion of a cross section in the length-thickness (L-T) direction, the thicknesses measured in a central section among 30 evenly divided sections of the individual dielectric layers in a length direction.

The average thickness, the maximum thickness, and the minimum thickness of the inner electrode layers were also determined by measuring the thicknesses of 10 inner electrode layers in a central portion of a cross section in the length-thickness (L-T) direction, the thicknesses measured in a central section among 30 evenly divided sections of the individual inner electrode layers in a length direction.

Table 1 below shows accelerated lifespan, breakdown voltage (BDV) and reliability characteristics, according to the average thickness of the dielectric layers, the average thickness of the inner electrode layers, and a ratio of a difference between the maximum thickness and the minimum thickness of the inner electrode layers to the average thickness of the dielectric layers.

TABLE 1

| Sample No. | Thickness of Dielectric Layer After Sintering td (μm) | Average Thickness of Inner Electrode Layer te (μm) | Maximum Thickness of Inner Electrode Layer tmax (μm) | Minimum Thickness of Inner Electrode Layer tmin (μm) | (tmax − tmin)/td | BDV (V) | NG rate of High-temperature Lifespan Test |
|---|---|---|---|---|---|---|---|
| *1 | 0.60 | 0.60 | 0.74 | 0.47 | 0.45 | 42 | 3/200 |
| *2 | 0.60 | 0.60 | 0.71 | 0.49 | 0.37 | 45 | 1/200 |
| *3 | 0.60 | 0.60 | 0.67 | 0.48 | 0.32 | 43 | 1/200 |
| 4 | 0.70 | 0.60 | 0.73 | 0.46 | 0.39 | 60 | 0/200 |
| 5 | 0.70 | 0.60 | 0.71 | 0.41 | 0.41 | 68 | 0/200 |
| 6 | 0.70 | 0.60 | 0.72 | 0.41 | 0.44 | 65 | 0/200 |

Referring to Table 1, Samples 1 to 3 each had dielectric layers with an average thickness of 0.6 μm or less. In these cases, problems may occur in a high-temperature accelerated lifespan test and a reliability test if a ratio ((tmax−tmin)/td) of the difference between the maximum thickness and the minimum thickness of the inner electrode layers to the average thickness of the dielectric layers deviates from a numerical value range of the present invention.

Meanwhile, Samples 4 to 6 each had dielectric layers with an average thickness of above 0.6 μm. In these cases, good results are shown in a high-temperature accelerated lifespan test even in the case that a ratio ((tmax−tmin)/td) of the difference between the maximum thickness and the minimum thickness of the inner electrode layers to the average thickness of the dielectric layers deviates from a numerical value range of the present invention.

Therefore, it could be seen that the multilayer ceramic electronic component according to the embodiment of the present invention has improved effects in high-temperature-accelerated lifespan and reliability when the average thickness td of the dielectric layers 1 is 0.6 μm or less after sintering.

Table 2 below shows that, in cases in which the average thickness of the dielectric layers is 0.6 μm or less, accelerated lifespan, breakdown voltage (BDV) and reliability characteristics, according to the average thickness of the inner electrode layers, the maximum and minimum thicknesses of the inner electrode layers, and a ratio of the difference between the maximum thickness and the minimum thickness of the inner electrode layers to the average thickness of the dielectric layers.

TABLE 2

| Sample No. | Thickness of Dielectric Layer After Sintering td (μm) | Average Thickness of Inner Electrode Layer te (μm) | Maximum Thickness of Inner Electrode Layer tmax (μm) | Minimum Thickness of Inner Electrode Layer tmin (μm) | (tmax − tmin)/ td | BDV (V) | NG rate of High-temperature Lifespan Test |
|---|---|---|---|---|---|---|---|
| 7 | 0.60 | 0.60 | 0.67 | 0.50 | 0.28 | 65 | 0/200 |
| 8 | 0.60 | 0.60 | 0.66 | 0.53 | 0.21 | 68 | 0/200 |
| 9 | 0.60 | 0.60 | 0.64 | 0.54 | 0.16 | 67 | 0/200 |
| *10 | 0.60 | 0.55 | 0.65 | 0.39 | 0.42 | 41 | 2/200 |
| *11 | 0.60 | 0.55 | 0.67 | 0.46 | 0.35 | 42 | 1/200 |
| *12 | 0.60 | 0.55 | 0.65 | 0.47 | 0.31 | 40 | 2/200 |
| 13 | 0.60 | 0.55 | 0.61 | 0.47 | 0.24 | 63 | 0/200 |
| 14 | 0.60 | 0.55 | 0.60 | 0.47 | 0.22 | 65 | 0/200 |
| 15 | 0.60 | 0.55 | 0.60 | 0.51 | 0.15 | 64 | 0/200 |
| *16 | 0.60 | 0.45 | 0.59 | 0.31 | 0.47 | 41 | 1/200 |
| *17 | 0.60 | 0.45 | 0.59 | 0.37 | 0.36 | 43 | 3/200 |
| *18 | 0.60 | 0.45 | 0.52 | 0.32 | 0.34 | 42 | 3/200 |
| 19 | 0.60 | 0.45 | 0.51 | 0.36 | 0.25 | 65 | 0/200 |
| 20 | 0.60 | 0.45 | 0.51 | 0.39 | 0.20 | 65 | 0/200 |
| 21 | 0.60 | 0.45 | 0.50 | 0.40 | 0.17 | 63 | 0/200 |
| *22 | 0.55 | 0.45 | 0.53 | 0.30 | 0.42 | 37 | 5/200 |
| *23 | 0.55 | 0.45 | 0.55 | 0.35 | 0.36 | 35 | 3/200 |
| *24 | 0.55 | 0.45 | 0.56 | 0.37 | 0.34 | 38 | 3/200 |
| 25 | 0.55 | 0.45 | 0.52 | 0.37 | 0.26 | 58 | 0/200 |
| 26 | 0.55 | 0.45 | 0.52 | 0.40 | 0.23 | 60 | 0/200 |
| 27 | 0.55 | 0.45 | 0.50 | 0.42 | 0.16 | 60 | 0/200 |

In Table 2, the breakdown voltage (BDV) characteristics were evaluated while DC voltage was applied at a rate of 10 V/sec. The NG rate in the high-temperature accelerated lifespan test was expressed as a percentage of the number of samples in which insulating resistance fell to $10^4 \Omega$ or less within 48 hours of a DC voltage of 9.45V being applied at 135☐, based on 200 individual samples.

As seen in Table 2 above, when the ratio of the difference between the maximum thickness and the minimum thickness of the inner electrode layers to the average thickness of the dielectric layers is below 0.30, the accelerated lifespan is increased while withstand voltage and reliability characteristics are improved.

As set forth above, according to embodiments of the present invention, a large-capacity multilayer ceramic electronic component capable of improving withstand voltage characteristics and having excellent reliability can be realized by improving uniformity in the thickness of inner electrode layers.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body including a dielectric layer; and
   first and second inner electrode layers formed within the ceramic body,
   wherein, when a thickness of the dielectric layer is defined as td and a maximum thickness and a minimum thickness of the first electrode layer or the second inner electrode layer are defined as tmax and tmin, respectively, td≦0.6 μm and (tmax−tmin)/td<0.30 are satisfied, and
   wherein, when an average diameter of ceramic powder particles used in the dielectric layer is defined as Dd and an average diameter of metal powder particles used in the first and second inner electrode layers is defined as De, 0.8≦De/Dd≦1.2 is satisfied.

2. The multilayer ceramic electronic component of claim 1, wherein the thickness of the dielectric layer is measured by scanning a cross section in a length-thickness (L-T) direction, which is cut in a central portion in a width (W) direction of the ceramic body.

3. The multilayer ceramic electronic component of claim 1, wherein, when a thickness of the first inner electrode layer or the second inner electrode layer is defined as te, te≦0.6 μm is satisfied.

4. The multilayer ceramic electronic component of claim 3, wherein the thickness of the first inner electrode layer or the second inner electrode layer is measured by scanning a cross section in a length-thickness (L-T) direction, which is cut in a central portion in a width (W) direction of the ceramic body.

5. The multilayer ceramic electronic component of claim 3, wherein a ratio (td/te) of the thickness of the dielectric layer to the thickness of the first inner electrode layer or the second inner electrode layer satisfies 1.0≦td/te≦1.5.

6. A multilayer ceramic electronic component, comprising:
   a ceramic body including a plurality of dielectric layers laminated therein; and
   a plurality of inner electrode layers formed within the ceramic body,
   wherein, when an average thickness of the plurality of dielectric layers is defined as td, and a maximum thickness and a minimum thickness of a single inner electrode layer selected from the plurality of inner electrode layers are defined as tmax and tmin, respectively, td≦0.6 μm and (tmax−tmin)/td<0.30 are satisfied, and
   wherein, when an average diameter of ceramic powder particles used in the dielectric layers is defined as Dd and an average diameter of metal powder particles used in the inner electrode layers is defined as De, 0.8≦De/Dd≦1.2 is satisfied.

7. The multilayer ceramic electronic component of claim 6, wherein the average thickness of the plurality of dielectric layers is measured by scanning a cross section in a length-thickness (L-T) direction, which is cut in a central portion in a width (W) direction of the ceramic body.

8. The multilayer ceramic electronic component of claim 6, wherein, when an average thickness of the single inner electrode layer selected from the plurality of inner electrode layers is defined as te, $te \leq 0.6$ μm is satisfied.

9. The multilayer ceramic electronic component of claim 8, wherein the average thickness of the single inner electrode layer selected from the plurality of inner electrode layers is measured by scanning a central portion of a cross section in a length-thickness (L-T) direction, which is cut in a central portion in a width (W) direction of the ceramic body.

10. The multilayer ceramic electronic component of claim 8, wherein a ratio (td/te) of the average thickness of the plurality of dielectric layers to the average thickness of the single inner electrode layer selected from the plurality of inner electrode layers satisfies $1.0 \leq td/te \leq 1.5$.

11. A multilayer ceramic electronic component, comprising:
a ceramic body including a plurality of dielectric layers laminated therein; and
a plurality of inner electrode layers formed within the ceramic body,
wherein, when an average thickness of the plurality of dielectric layers is defined as td, and a maximum thickness and a minimum thickness of the plurality of inner electrode layers are defined as tmax and tmin, respectively, $td \leq 0.6$ μm and $(tmax-tmin)/td \leq 0.30$ are satisfied, and
wherein, when an average diameter of ceramic powder particles used in the dielectric layers is defined as Dd and an average diameter of metal powder particles used in the inner electrode layers is defined as De, $0.8 \leq De/Dd \leq 1.2$ is satisfied.

12. The multilayer ceramic electronic component of claim 11, wherein the average thickness of the plurality of dielectric layers is measured by scanning a cross section in a length-thickness (L-T) direction, which is cut in a central portion in a width (W) direction of the ceramic body.

13. The multilayer ceramic electronic component of claim 11, wherein, when an average thickness of the plurality of inner electrode layers is defined as te, $te \leq 0.6$ μm is satisfied.

14. The multilayer ceramic electronic component of claim 11, wherein the average thickness of the plurality of inner electrode layers is measured by scanning a cross section in a length-thickness (L-T) direction, which is cut in a central portion in a width (W) direction of the ceramic body.

15. The multilayer ceramic electronic component of claim 11, wherein a ratio (td/te) of the average thickness of the plurality of dielectric layers to an average thickness of the plurality of inner electrode layers satisfies $1.0 \leq td/te \leq 1.5$.

* * * * *